US012519706B2

(12) United States Patent
Cociglio

(10) Patent No.: US 12,519,706 B2
(45) Date of Patent: Jan. 6, 2026

(54) PERFORMANCE MEASUREMENT IN A PACKET SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 18/002,802

(22) PCT Filed: Jun. 24, 2021

(86) PCT No.: PCT/EP2021/067280
§ 371 (c)(1),
(2) Date: Dec. 21, 2022

(87) PCT Pub. No.: WO2021/260088
PCT Pub. Date: Dec. 30, 2021

(65) Prior Publication Data
US 2023/0246928 A1 Aug. 3, 2023

(30) Foreign Application Priority Data
Jun. 26, 2020 (IT) ........................ 102020000015421

(51) Int. Cl.
*H04L 43/026* (2022.01)
*H04L 43/0817* (2022.01)
*H04L 43/16* (2022.01)

(52) U.S. Cl.
CPC ........ *H04L 43/026* (2013.01); *H04L 43/0817* (2013.01); *H04L 43/16* (2013.01)

(58) Field of Classification Search
CPC .... H04L 43/026; H04L 43/0817; H04L 43/16
See application file for complete search history.

(56) References Cited

U.S. PATENT DOCUMENTS 7,457,868 B1 * 11/2008 Guo ........................ H04L 43/50
709/224
2003/0221000 A1 * 11/2003 Cherkasova ............ H04L 67/54
709/224

(Continued)

FOREIGN PATENT DOCUMENTS

CN 107342809 A 11/2017

OTHER PUBLICATIONS

International Search Report mailed on Sep. 28, 2021 in PCT/EP2021/067280 filed on Jun. 24, 2021, 3 pages.

(Continued)

*Primary Examiner* — Glenton B Burgess
*Assistant Examiner* — Jihad K Boustany
(74) *Attorney, Agent, or Firm* — Oblon, McClelland, Maier & Neustadt, L.L.P.

(57) ABSTRACT

It is disclosed a method and system for providing performance measurements in a packet-switched communication network, wherein a performance measurement application run by a user communication device monitors the performance of a packet flow which a user application run by the user communication device exchanges with the packet-switched communication network. This monitoring comprising providing values of a performance parameter relating to the packet flow. If, based on the performance parameter values provided by the performance measurement application, a failure condition affecting the packet flow is detected, a further monitoring of the performance of the packet flow is activated, by one or more measurement points located within the packet-switched communication network on the path of the packet flow. This further monitoring comprising providing values of a further performance parameter relating to the packet flow.

12 Claims, 2 Drawing Sheets start
application 10 provides performance parameter values PP(i) 301
failure condition? 302
n y
303 application 10 sends update messages to server 12
304 application 10 sends alarm message to server 12
server 12 activates measurement point 11 305
measurement point 11 provides further performance parameter value PP'(i) 306
measurement point 11 sends update messages to server 12 307
end

(56) References Cited

U.S. PATENT DOCUMENTS

| | | | | |
|---|---|---|---|---|
| 2008/0052394 | A1* | 2/2008 | Bugenhagen | H04L 45/28 709/224 |
| 2012/0087235 | A1 | 4/2012 | Smith et al. | |
| 2015/0031307 | A1 | 1/2015 | Gao et al. | |
| 2016/0063387 | A1* | 3/2016 | Srivastava | G06N 5/048 709/204 |
| 2016/0285783 | A1* | 9/2016 | Uriel | G06F 11/30 |
| 2016/0380878 | A1 | 12/2016 | Bugenhagen et al. | |
| 2017/0187570 | A1* | 6/2017 | Estrada | H04L 41/0631 |
| 2017/0346705 | A1* | 11/2017 | Szilagyi | H04W 28/0284 |
| 2018/0288126 | A1* | 10/2018 | Smart | H04L 69/22 |
| 2019/0158368 | A1 | 5/2019 | Cociglio | |
| 2020/0296011 | A1* | 9/2020 | Jain | H04L 43/026 |
| 2022/0060448 | A1* | 2/2022 | White | H04L 63/1441 |

OTHER PUBLICATIONS

M. Cociglio et al, "New Spin bit enabled measurements with one or two more bits draft-cfb-ippm-spinbit-new-measurements-01", Internet Draft, 2019, XP002802106, 14 pages.

Chinese Office Action dated Oct. 17, 2024, issued in Chinese Patent Application No. 202180044621.8.

* cited by examiner

PERFORMANCE MEASUREMENT IN A PACKET SWITCHED COMMUNICATION NETWORK

TECHNICAL FIELD

The present invention relates to the field of communication networks. In particular, the present invention relates to a method and system for performing a performance measurement in a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks. IP networks may support QUIC (Quick UDP Internet Connections), which is a transport layer (layer 4) network protocol designed to support multiplexed connections between two endpoints (client and server) over User Datagram Protocol (UDP).

Performance of a packet switched communication network is typically measured in terms of packet loss and/or delay and/or jitter. These measurements may be either one-way or round-trip.

Measurement techniques are known which operate directly on the packet flows carrying user data, without requiring the transmission of any artificial packet (such as ping packets) dedicated for measurement purpose. These techniques typically provide for marking the packets of the packet flow to be measured and for deploying one or more measurements points on the path of the marked packets. Each measurement point provides one or more performance parameters relating to the marked packets (typically counters and/or timestamps) which are then used to determine the performance of that packet flow. Some of these techniques require a single measurement point to be implemented on the path of the marked packets, the measurement point being capable of autonomously determining a performance measurement (e.g. a packet loss measurement or a delay measurement) based on its own performance parameter(s) (namely, without using performance parameter(s) provided by other measurement points).

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which enables RTT (round-trip time) measurements between client and server of a QUIC connection by a measurement point located on the connection.

M. Cociglio et al.: Internet Draft "New Spin bit enabled measurements with one or two more bits draft-cfb-ippm-spinbit-new-measurements-01", Jul. 1, 2019 describes the addition of a so-called Loss bit in the QUIC header, which enables round-trip packet loss measurements between client and server of a QUIC connection by a measurement point located on the connection.

A. Ferrieux et al.: Internet Draft "Packet Loss Signaling for Encrypted Protocols draft-ferrieuxhamchaoui-quic-lossbits-03", Jan. 16, 2020 describes an extension of the QUIC protocol introducing two bits in the packet header, namely a Q bit (sQuared signal bit) and an L bit (Loss event bit), which enable different types of one-way packet loss measurements (including end-to-end measurements, upstream measurements and downstream measurement) by a measurement point located on the connection.

SUMMARY OF THE INVENTION

The Applicant has noticed that providing a performance measurement (e.g. by any of the above known techniques) which is indicative of the actual overall performance of a packet-switched network and, at the same time, provides results with the desired granularity, requires monitoring individually the performance of all the packet flows transmitted through the network, or at least a significant portion thereof. Since a node of a communication network is typically crossed by several packet flows (typically, from tens-hundreds packet flows at DSLAMs and eNodeBs to million packet flows at backbone nodes, peering nodes and gateways to WANs), a measurement point implemented at a network node has to be configured to detect several packet flows and provide performance measurements relating to each one of them. This would require a huge computational effort by the measurement point.

In view of the above, the Applicant has perceived the need to provide a method and system for performing a performance measurement in a packet-switched communication network, which overcomes or mitigates the aforesaid drawback.

In particular, the Applicant has tackled the problem of providing a method and system for performing a performance measurement in a packet-switched communication network, which allows reducing the computational effort required by the measurement point(s) deployed within the network.

According to embodiments of the present invention, this problem is solved by providing a computer program product (also termed "performance measurement application" in the following description) suitable for installation on a user communication device (such as a smartphone, a PC, a tablet, a IoT device, etc.). The user communication device is provided with at least one user application (e.g. browser, videoconferencing app, social network app, e-commerce app, e-banking app, etc.) configured to exchange at least one packet flow (typically, a bidirectional packet flow) with the packet-switched communication network. When the performance measurement application is run by the user communication device, it monitors the performance of the bidirectional packet flow which the user application run by the user communication device exchanges with the communication network, by providing values of at least one performance parameter relating thereto (e.g. packet loss values, delay values, etc.). If, based on the performance parameter values provided by the performance measurement application, a failure condition affecting the packet flow is detected, a further monitoring of the packet flow by at least one measurement point located on its path is also activated, so that the at least one measurement point provides values of at least one further performance parameter relating to the packet flow (e.g. packet loss values, delay values, etc.).

The system and method according to the present invention then advantageously allows reducing the computational effort required by the measurement point(s) deployed in the network.

In normal conditions indeed (namely, with no failure condition), only the performance measurement application monitors the performance of the packet flow, thereby acting as a measurement point capable of monitoring the packet flow that the user communication device is exchanging with the packet-switched communication network and of detecting any failure condition which might affect the packet flow. In normal condition the measurement point is instead kept inactive, and is activated only when a failure condition is detected.

Hence, even if measurement points are deployed at network nodes crossed by hundreds or even million packet flows (e.g. a gateway to a WAN), they are used to monitor the performance of only specific packet flows, namely those for which failure conditions have been detected based on performance parameter values provided by the performance measurement applications run by the user communication devices connected to the network. This requires much fewer computational resources by the measurement points than a continuous monitoring of the performance of all the packet flows crossing the measurement points.

Since the measurement points are located on the path of the packet flows, the further performance parameter values provided by the measurement points could provide e.g. indications on the path length affected by the failure condition detected based on the performance parameter values provided by the performance measurement applications.

For example, a performance measurement application could provide round-trip packet loss values between itself and the network node that terminates the path of the bidirectional packet flow at the opposite end, e.g. according to the technique disclosed by the above Internet draft of M. Cociglio et al. As far as no failure condition is detected (for example, the round-trip packet loss values do not exceed a predefined maximum threshold), the packet flow continues being monitored by the performance measurement application only.

If, at some point, a failure condition is detected based on the round-trip packet loss values provided by the performance measurement application (for example, one or more consecutive round-trip packet loss values exceed the predefined maximum threshold), a measurement point located on the path of the packet flow is activated to start a further monitoring of the packet flow, by providing values e.g. of the round-trip packet loss between itself and the network node that terminates the path of the bidirectional packet flow at the end opposite to the user communication device. These further round-trip packet loss values advantageously provide an indication as to whether the failure condition detected by the performance measurement application is occurring on the path length between user communication device and measurement point or on the path length between measurement point and network node that terminates the path of the bidirectional packet flow at the opposite end.

According to a first aspect, the present invention provides a method for providing performance measurements of a packet-switched communication network, the method comprising:

a) by a performance measurement application run by a user communication device, monitoring a performance of at least one packet flow which a user application run by the user communication device exchanges with the packet-switched communication network, the monitoring comprising providing values of at least one performance parameter relating to the at least one packet flow;

b) based on the values of the at least one performance parameter provided by the performance measurement application, detecting a failure condition affecting the at least one packet flow; and c) in response to the detection of the failure condition, activating a further monitoring of a performance of the at least one packet flow by at least one measurement point located within the packet-switched communication network on the path of the at least one packet flow, the further monitoring comprising providing values of at least one further performance parameter relating to the at least one packet flow.

According to an embodiment, step b) comprises comparing the values of the at least one performance parameter with a predefined threshold and detecting the failure condition when one or more consecutive values of the least one performance parameter overcome the predefined threshold.

Preferably, step b) is performed by the performance measurement application.

Preferably, step b) comprises informing a measurement management server cooperating with the performance measurement application and the at least one measurement point of the failure condition by sending an alarm message from the performance measurement application to the measurement management server.

Preferably, step c) comprises sending an activation message by the measurement management server to the at least one measurement point.

Alternatively, the at least one measurement point is preconfigured to monitor packets comprising a predefined dedicated identifier and step c) comprises sending by the measurement management server to the performance measurement application an instruction to insert the predefined dedicated identifier in the at least one packet flow.

Optionally, step a) further comprises, as long as no failure condition is detected, sending from the performance measurement application to the measurement management server periodic acknowledge messages informing the measurement management server that the monitoring is ongoing and no failure condition is being detected.

Preferably, step a) further comprises sending from the performance measurement application to the measurement management server update messages comprising periodic updates on the values of the at least one performance parameter.

Preferably, step c) further comprises sending from the at least one measurement point to the measurement management server update messages comprising periodic updates on the values of the at least one further performance parameter.

According to an embodiment, step a) comprises:

activating a marking functionality on the at least one packet flow, the marking functionality comprising marking upstream packets of the at least one packet flow and inducing a network node of the packet-switched communication network originating downstream packets of the at least one packet flow to mark the downstream packets; and detecting the marked upstream packets as transmitted by the user communication device and/or the marked downstream packets as received by the user communication device and providing the values of the at least one performance parameter based on the detecting.

Preferably, at step a) marking the upstream packets of the at least one packet flow comprises setting the value of at least one measurement-dedicated field in the upstream packets; and inducing a network node of the packet-switched communication network originating downstream packets of the packet flow to mark the downstream packets comprises inducing the network node to set the value of at least one measurement-dedicated field in the downstream packets.

According to a second aspect, the present invention provides a system for providing performance measurements of a packet-switched communication network, the system comprising:

a performance measurement application configured to, when run by a user communication device, monitor a performance of at least one packet flow which a user application run by the user communication device exchanges with the packet-switched communication network, the monitoring comprising providing values of at least one performance parameter relating to the at least one packet flow; and at least one measurement point located within the packet-switched communication network on the path of the at least one packet flow, the at least one measurement point being configured to, in response to detection of a failure condition affecting the at least one packet flow based on the values of the at least one performance parameter provided by the performance measurement application, activating a further monitoring of a performance of the at least one packet flow, the further monitoring comprising providing values of at least one further performance parameter relating to the at least one packet flow.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
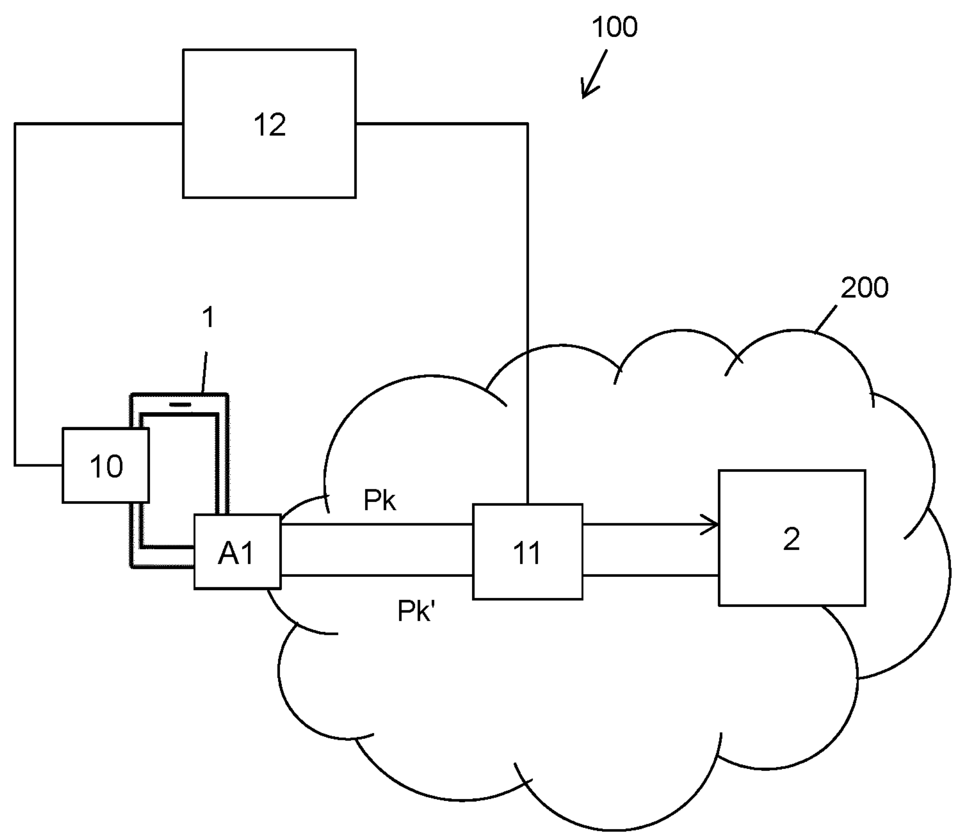
FIG. 1 schematically shows the architecture of a performance measurement system according to embodiments of the present invention.

FIG. 1 schematically shows the architecture of a system 100 providing performance measurements of a packet-switched communication network 200, according to embodiments of the present invention.

The system 100 comprises a performance measurement application 10 suitable for installation on a user communication device 1, at least one measurement point 11 and a measurement management server 12.

The performance measurement application 10 may be downloaded and installed on the user communication device 1, or it may be part of the operating system of the user communication device 1. The user communication device 1 may be a PC, a smartphone, a tablet, an IoT (Internet of Things) device or any other device provided with the capability of connecting to the packet-switched communication network 200. The connectivity may be wired or wireless (e.g. Wi-Fi or mobile). The user communication device 1 may be either a personal device (typically, its user is also its owner) or a business device (typically, its owner is a natural person or legal person other than its user).

The user communication device 1 is provided with at least one user application A1 configured to provide the device 1 with a communication service offered by a service provider, such as for example a web browsing service, a videoconferencing service, a multimedia streaming service, an e-commerce service, an e-banking service and so on. The user communication device 1 may comprise several user applications providing different communication services. The user application A1 (as well as the other user applications of the device 1, if any) supports provision of the respective communication service by exchanging a flow of user packets with the packet-switched communication network 200, in particular with a network node 2 (typically, a server of a service provider). The packet flow typically is bidirectional, namely it comprises both upstream packets Pk (namely, packets transmitted from the device 1 to the network 200) and downstream packets Pk' (namely, packets transmitted from the network 200 to the device 1). The user application A1 originates the upstream packets Pk to be transmitted to the network node 2 and terminates the downstream packets Pk' received from the network node 2.

The measurement point 11 is preferably implemented at a node of the packet-switched communication network 200, on the path which the upstream packets Pk and/or the downstream packets Pk' follow between the user communication device 1 and the network node 2. The measurement point 11 in particular is preferably implemented at an intermediate node between the user communication device 1 and the network node 2.

The measurement management server 12 preferably is operatively connected with both the performance measurement application 10 and the measurement point 11. The measurement management server 12 may be implemented as a single machine or as a cluster of machines, e.g. by a cloud computing technique within the network 200. The measurement management server 12 may be operatively connected with the performance measurement application 10 and the measurement point 11 via the network 200 itself or via another network, not depicted in FIG. 1.

According to embodiments of the present invention, the performance measurement application 10 is configured to, when it is run by the user communication device 1, monitor the performance of the bidirectional packet flow Pk, Pk' which the user application A1 exchanges with the node 2 of the communication network 200, by providing values of a performance parameter relating thereto (e.g. packet loss values, delay values, etc.). When, based on the performance parameter values provided by the performance measurement application 10, a failure condition is detected, the measurement management server 12 preferably instructs the measurement point 11 to also start monitoring the performance of the bidirectional packet flow Pk, Pk', by providing values of a further performance parameter relating thereto (e.g. packet loss values, delay values, etc.).

Figure 3:
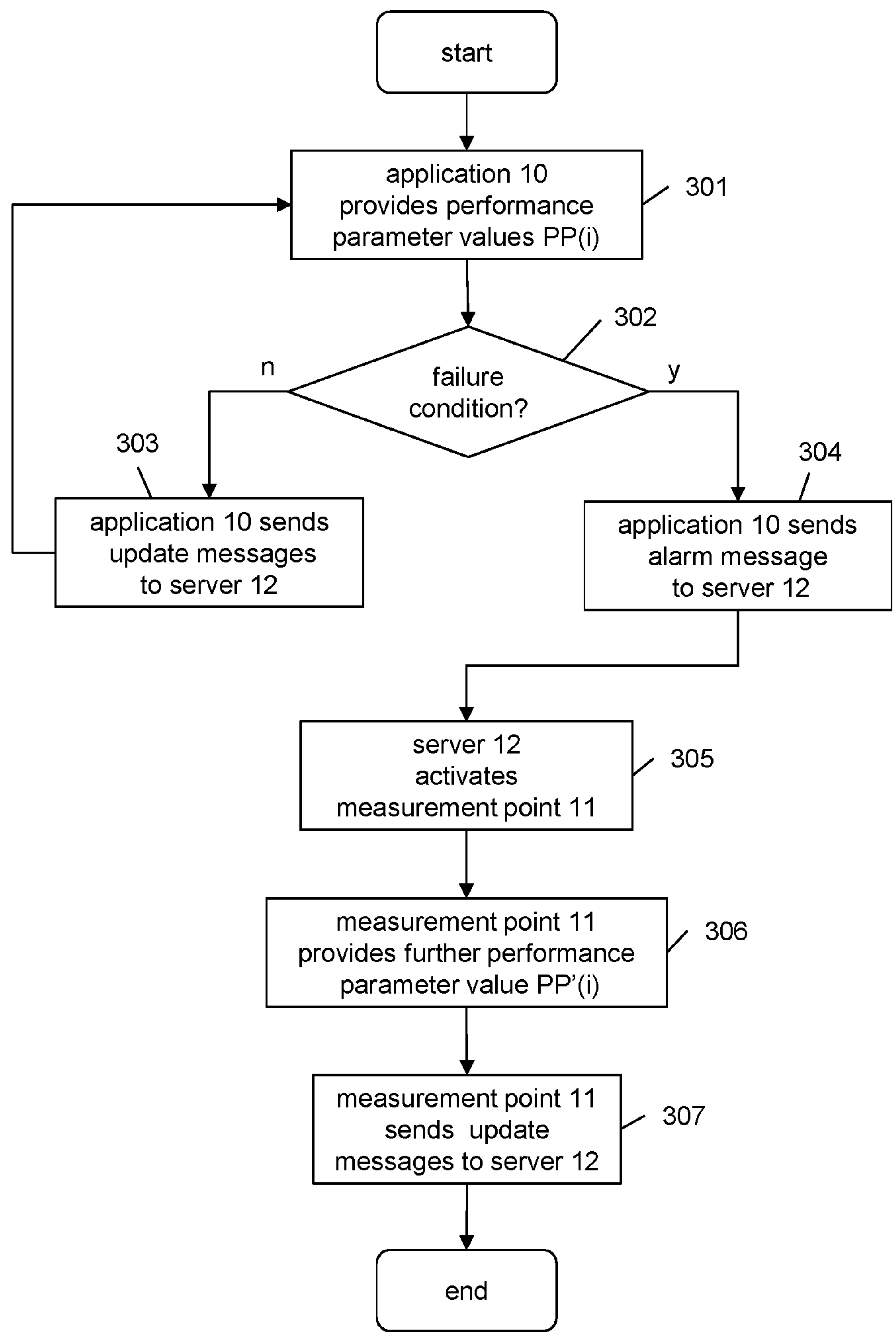
FIG. 3 is a flow chart of the operation of the performance measurement system of FIG. 1, according to embodiments of the present invention.

The operation of the system 100 and its components will be now described in further detail with reference to the flow chart of FIG. 3.

At a first step 301, the performance measurement application 10 preferably starts monitoring the performance of the bidirectional packet flow Pk, Pk' which the user application A1 exchanges with the node 2 of the communication network 200, by providing values PP(i) of at least one performance parameter relating thereto (step 301). The performance parameter values PP(i) may be provided periodically. The performance parameter values PP(i) may be for example packet loss values, or delay values.

Preferably, step 301 is triggered by reception of a performance measurement request which the performance measurement application 10 receives from e.g. the owner or user of the device 1 or the measurement management server 12. Such request may comprise an identified of the packet flow Pk, Pk' to be measured, e.g. its destination address, and the type of performance measurement to be performed (packet loss, delay, etc.).

According to embodiments of the present invention, the requested performance measurement relies on a marking of the packets Pk, Pk'.

Figure 2:
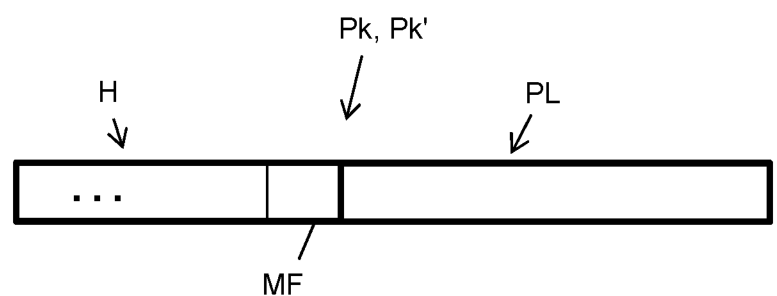
FIG. 2 schematically shows the structure of a packet transmitted or received by the user communication device of FIG. 1, according to embodiments of the present invention.

In particular, as schematically depicted in FIG. 2, each packet Pk, Pk' exchanged by the user application A1 comprises a payload PL comprising user data and at least one header H. In case of multiple headers, each header pertains to a different network layer. For example, each packet Pk, Pk' may comprise a network layer header (such as an IP header) and transport layer header (such as a QUIC header or a TCP header). One of the headers H (typically, the network layer header) comprises packet forwarding information, namely information allowing the upstream packets Pk generated by the user communication device 1 to reach the network node 2 and the downstream packets Pk' generated by the network node 2 to reach the user communication device 1.

Each packet Pk, Pk' also preferably comprises at least one measurement dedicated field MF (also termed herein after "marking field") supporting at least one type of performance measurement on the packet flow Pk, Pk'. The marking field(s) MF may be comprised in the same header H as the packet forwarding information (as shown in FIG. 2), in a different header (if any) or in the payload PL. Assuming for example that the packets Pk, Pk' comprise a network layer header (such as an IP header) and a transport layer header (such as a QUIC header), the marking field(s) MF may be comprised in the transport layer header.

The number of marking fields and their position within the packets Pk, Pk' depend on the protocol(s) according to which the packets are formatted and the type of supported performance measurement(s). By way of non-limiting example, if the packets Pk, Pk' are formatted according to the QUIC protocol, the marking field(s) MF may be in the QUIC header and may comprise (i) a spin bit supporting an RTT measurement as disclosed in the above Internet draft of B. Trammel et al. and/or (ii) a Loss bit supporting a round-trip packet loss measurement as disclosed in the above Internet draft of M. Cociglio et al. and/or (iii) a Q bit and an L bit supporting different types of one-way packet loss measurements as disclosed in the above Internet draft of A. Ferrieux et al.

At step 301, the performance measurement application 10 preferably activates a marking functionality on the packet flow Pk, Pk', which provides for marking the upstream packets Pk originated by the user application A1 and for inducing the network node 2 to also mark the downstream packets Pk', so as to support the requested performance measurement on the packet flow Pk, Pk'. The marking consists in appropriately setting the values of the marking field(s) MF in the packets Pk, Pk' which support the requested performance measurement. If, for example, a round-trip packet loss measurement as disclosed by the above known Internet draft of M. Cociglio et al. has been requested, the marking consists in setting the value of the Loss bit in the packets Pk, Pk'. The marking of the upstream packets Pk and downstream packets Pk' are reciprocally consistent in that they support a same performance measurement on the packets Pk, Pk'.

The marking functionality may be embedded in the user application A1, namely the value of the marking field(s) MF in the upstream packets Pk may be set exclusively by the user application A1. This is the case, for example, when the marking field(s) MF of the packets Pk, Pk' are comprised in a header of a client-server protocol (such as QUIC), whose client is embedded in the user application A1 itself. In this case, at step 301 the performance management application 10 instructs the user application A1 to activate the marking functionality.

Otherwise (e.g. in case TCP is used as a transport layer protocol by the user application A1), the performance management application 10 may perform the marking functionality of its own, by appropriately setting the value of the relevant marking field(s) MF.

In order to induce the network node 2 originating the downstream packets Pk' to mark them consistently with the marking of the upstream packets Pk, different mechanisms may be used.

If, for example, the marking field(s) MF of the packets Pk, Pk' are comprised in a header of a client-server protocol (such as QUIC), whose client is embedded in the user application A1 itself and whose server is in the network node 2 originating the downstream packets Pk', the client in the user application A1 could instruct the server in the network node 2 to start the marking of the downstream packets Pk'. Such instructing may comprise transmission of an explicit marking instruction from client to server. Otherwise, the server at the network node 2 could be configured to permanently implement a reflection mechanism whereby it reflects the value of the marking field(s) MF in the received upstream packets Pk into the marking field(s) MF of corresponding downstream packets Pk' (for example, the next packet in the corresponding downstream packet flow). In this case, as the client in the user application A1 starts marking the upstream packets Pk, the server in the network node 2 receives them and—by simply continuing to implement its reflection mechanism—automatically marks the downstream packets Pk' consistently with the marking of the upstream packets Pk.

According to other embodiments, the performance management application 10 may send a marking instruction to the network node 2, or negotiate the marking with it.

Upon activation of the marking functionality by the user application A1, at step 301 the performance management application 10 preferably starts detecting the marked upstream packets Pk as transmitted by the user communication device 1 and/or the marked downstream packets Pk' as received by the user communication device 1 and to provide the values PP(i) of a performance parameter indicative of the requested performance measurement. The performance parameter values PP(i) may be provided periodically.

If, for example, a round-trip packet loss measurement as disclosed by the above known Internet draft of M. Cociglio et al. has been requested, the performance management application 10 may count the number of transmitted upstream packets Pk with Loss bit equal to 1 in each pair of consecutive trains of upstream packets Pk and provide values PP(i) of the round-trip packet loss based on such counts.

While performing step 301, the performance measurement application 10 determines possible failure conditions which might affect the packet flow Pk, Pk' (step 302). The determination of possible failure conditions is preferably based on the performance parameter values PP(i) provided at step 301.

According to an embodiment, in order to determine possible failure conditions affecting the packet flow Pk, Pk' at step 302, the performance measurement application 10 preferably compares the performance parameter values PP(i) provided at step 301 with a predefined threshold TH. As far as the performance parameter values PP(i) do not exceed the threshold TH, no failure condition is determined at step 302. If one or more consecutive performance parameter values PP(i) exceed the threshold TH, a failure condition is instead determined. The threshold TH may be decided by the measurement management server 12 and communicated to the performance measurement application 10 before the measurement is started. The threshold may be static or may be modified or dynamically varied by the measurement management server 12. If, for example, a round-trip packet loss measurement as disclosed by the above known Internet draft of M. Cociglio et al. has been requested, the threshold TH may be a maximum value of the round-trip packet loss.

As long as no failure condition affecting the packet flow Pk, Pk' is detected at step 302, the performance measurement application 10 preferably continues monitoring the packet flow Pk, Pk'. The performance measurement application 10 may also send to the measurement management server 12 periodic acknowledge messages informing the measurement management server 12 that the monitoring is ongoing and no failure condition is being detected.

Alternatively or additionally, the performance measurement application 10 may also send to the measurement management server 12 update messages comprising periodic updates on the measurement results (step 303). The update messages in particular may comprise the performance measurement values PP(i) calculated since the last update. In addition or alternatively, the update messages may comprise statistics of the performance measurement values PP(i) calculated since the last update, such as their average value, their maximum value and their minimum value. The update messages may be transmitted to the measurement management server 12 with a longer periodicity than the calculation of the performance parameter values PP(i) (e.g. once a week).

If, at a certain point, a failure condition affecting the packet flow Pk, Pk' is detected, the performance measurement application 10 preferably informs the measurement management server 12 of this event by sending it an alarm message (step 304). The alarm message preferably comprises an identifier of the packet flow Pk, Pk' (e.g. its IP source address and/or its IP destination address) and, optionally, also an indication of the failure type (e.g. packet loss failure, delay failure, etc.). The alarm message may also comprise the performance parameter value(s) PP(i) based on which the failure condition has been detected (e.g. those which overcome the predefined threshold TH).

According to another variant, the measurement management server 12 itself may determine occurrence of a failure condition, for example based on the performance parameter values PP(i) comprised in the update messages received at step 303 from the performance measurement application 10.

When the measurement management server 12 is informed by the performance management application 10 of the failure condition (or detects the failure condition by itself, according to the variant described above), the measurement management server 12 preferably activates the measurement point 11 (step 305), e.g. by sending it an activation message.

Such activation message preferably comprises an identifier of the packet flow Pk, Pk', which allows the measurement point 11 to uniquely identify the packets of the packet flow to be monitored. Such identifier may comprise for example the IP source address and IP destination address of the upstream packets Pk and/or the downstream packets Pk'. The activation message also preferably comprises the type of performance measurement to be performed (packet loss, delay, etc.).

Alternatively, the measurement point 11 may be preconfigured to monitor packet flows identified by one or more dedicated identifiers (e.g. a set of IP addresses) normally unused for transmission of the packet flows within the network 200. When at step 302 the performance measurement application 10 detects that a failure condition is affecting the packet flow Pk, Pk', it preferably changes the IP address in the upstream packets Pk and/or downstream packets Pk' into one of the dedicated addresses. More specifically, upon reception of an alarm message informing the measurement management server 12 of the detection of a failure condition affecting the packet flow Pk, Pk', the measurement management server 12 preferably instructs the performance measurement application 10 to change the IP source address in the upstream packets Pk or the IP destination address in the downstream packets Pk' into one of the dedicated addresses, by changing the IP address assigned to the user communication device 1 into one of the dedicated addresses. This automatically triggers monitoring of the performance of the packet flow Pk, Pk' by the measurement point 11, without the need of sending any activation message to the measurement point 11. Such variant is advantageous when, for example, several measurement points 11 shall be activated and/or when determining which measurement point(s) 11 shall be activated is complex, e.g. due to a particularly complex network topology.

In response to reception of the activation message from the measurement management server 12, the measurement point 11 starts monitoring the performance of the bidirectional packet flow Pk, Pk', by providing values of at least one further performance parameter relating thereto PP'(i) (e.g. packet loss values, delay values, etc.) (step 306). Since the packets Pk, Pk' are already marked (the marking functionality has been activated by the performance measurement application 10 at step 301), the monitoring by the measurement point 11 may also rely on such marking.

While the measurement point 11 is providing the further performance parameter values PP'(i), it may send to the measurement management server 12 periodic update messages (step 307) comprising a periodic update of the measurement results. The update messages in particular may comprise the further performance measurement values PP'(i) calculated since the last update. In addition or alternatively, the update messages may comprise statistics of the further performance measurement values PP' (i) calculated since the last update, such as their average value, their maximum value and their minimum value. The update messages may be transmitted to the measurement management server 12 with a longer periodicity than the calculation of the further performance parameter values PP'(i).

Since the measurement point 11 is located on the path of the packet flow Pk, Pk', the further performance parameter values PP'(i) provided by the measurement point 11 could provide the measurement management server 12 e.g. with an indication of the path length, or path section, which is affected by the failure condition detected at step 302 based on the performance parameter values PP(i).

For example, at step 301 the performance measurement application 10 could provide round-trip packet loss values between the user communication device 1 and the network node 2 that terminates the path of the bidirectional packet flow Pk, Pk' at the opposite end, e.g. according to the technique disclosed by the above Internet draft of M. Cociglio et al.

As far as no failure condition is detected (for example, the round-trip packet loss values do not exceed a predefined maximum threshold TH), the packet flow Pk, Pk' continues being monitored by the performance measurement application 10 only.

If, at some point, a failure condition is detected based on the round-trip packet loss values PP(i) provided by the performance measurement application 10 (for example, one or more consecutive round-trip packet loss values exceed the predefined maximum threshold TH), the measurement management server 12 instructs the measurement point 11 to also start monitoring the bidirectional packet flow Pk, Pk' (step 305), by providing values PP'(i) e.g. of the round-trip packet loss between the measurement point 11 itself and the network node 2 that terminates the path of the bidirectional packet flow Pk, Pk' at the end opposite to the user communication device 1 (step 306). These further round-trip packet loss values PP'(i) advantageously provide an indication as to whether the failure condition detected by the performance measurement application 10 is occurring on the path length between user communication device 1 and measurement point 11, or on the path length between measurement point 11 and network node 2.

If several measurement points 11 are distributed along the path of the packets Pk, Pk' between user communication device 1 and network node 2, the further performance parameter values provided by each one of them at steps 306 and 307 would allow the measurement management server 12 to determine the location of the failure more precisely.

The system 100 according to the present invention then advantageously allows reducing the computational effort required by the measurement point(s) 11 deployed in the packet-switched communication network 200.

In normal conditions indeed (namely, when no failure condition is detected at step 302), only the performance measurement application 10 monitors the performance of the packet flow Pk, Pk', thereby acting as a measurement point capable of monitoring the packet flow Pk, Pk' that the user communication device 1 is exchanging with the packet-switched communication network 200 and of detecting any failure condition which might affect the packet flow Pk, Pk'. In normal condition the measurement point(s) 11 is instead kept inactive, and is activated by the measurement management server 12 only when a failure condition is detected based on the performance parameter values PP(i) provided by the performance measurement application 10.

Hence, even if the measurement point 11 is deployed at a node of the network 200 crossed by hundreds or even millions of packet flows (e.g. a gateway to a WAN), it is used to monitor the performance of only specific packet flows, namely the ones for which a failure condition has been detected based on the performance parameter values PP(i) provided by the one or more performance measurement application(s) 10. This requires much fewer computational resources by the measurement point 11 than a continuous monitoring of the performance of all the packet flows crossing the measurement point.

The invention claimed is:

1. A method for providing performance measurements of a packet-switched communication network, said method comprising:

a) by a performance measurement application run by a user communication device, monitoring a performance of user packets which a user application, run by said user communication device and configured to provide the user communication device with a communication service offered by a service provider, exchanges with said packet-switched communication network, the user application supporting provision of the communication service by exchanging the user packets with the said packet-switched communication network and said monitoring comprising providing values of at least one performance parameter relating to said user packets which the user application, run by said user communication device, exchanges with said packet-switched communication network, the at least one performance parameter monitored by the performance measurement application being a round-trip packet loss value between the user communication device and a network node that terminates the path of the user packets;

b) based on said values of said at least one performance parameter provided by said performance measurement application, detecting a failure condition affecting said user packets which the user application, run by said user communication device, exchanges with said packet-switched communication network and informing a measurement management server cooperating with said performance measurement application run by said user communication device of said failure condition; and c) in response to said detection of said failure condition, activating, by said measurement management server, a further monitoring of a performance of said user packets which the user application, run by said user communication device, exchanges with said packet-switched communication network by at least one measurement point cooperating with said measurement management server and located within said packet-switched communication network on a path of said user packets which the user application, run by said user communication device, exchanges with said packet-switched communication network, said further monitoring comprising providing values of at least one further performance parameter relating to said user packets which the user application, run by said user communication device, exchanges with said packet-switched communication network, wherein step a) comprises:

activating a marking functionality on said user packets, the user packets comprising downstream user packets and upstream user packets, said marking functionality comprising:

marking the upstream user packets, and inducing a network node of said packet-switched communication network originating the downstream user packets to mark said downstream user packets:

detecting said marked upstream user packets as transmitted by said user communication device and/or said marked downstream user packets as received by said user communication device; and providing said values of said at least one performance parameter based on said detecting.

2. The method according to claim 1, wherein step b) comprises comparing said values of said at least one performance parameter with a predefined threshold and detecting said failure condition when one or more consecutive values of said at least one performance parameter overcome said predefined threshold.

3. The method according to claim 1, wherein step b) is performed by said performance measurement application run by said user communication device.

4. The method according to claim 3, wherein step b) comprises sending an alarm message from said performance measurement application run by said user communication device to said measurement management server.

5. The method according to claim 4, wherein step c) comprises sending an activation message by said measurement management server to said at least one measurement point.

6. The method according to claim 4, wherein said at least one measurement point is preconfigured to monitor user packets comprising a predefined dedicated identifier, and wherein step c) comprises sending by said measurement management server to said performance measurement application run by said user communication device an instruction to insert said predefined dedicated identifier into the user packets.

7. The method according to claim 4, further comprising, as long as no failure condition is detected, sending from said performance measurement application run by said user communication device to said measurement management server periodic acknowledge messages informing said measurement management server that said monitoring is ongoing and no failure condition is being detected.

8. The method according to claim 4, wherein step a) further comprises sending from said performance measurement application run by said user communication device to said measurement management server update messages comprising periodic updates on said values of said at least one performance parameter.

9. The method according to claim 4, wherein step c) further comprises sending from said at least one measurement point to said measurement management server update messages comprising periodic updates on said values of said at least one further performance parameter.

10. The method according to claim 1, wherein at step a):

said marking said upstream user packets comprises setting the value of at least one measurement-dedicated field in said upstream user packets, and said inducing the network node of said packet-switched communication network originating said downstream user packets to mark said downstream user packets comprises inducing said network node to set the value of at least one measurement-dedicated field in said downstream user packets.

11. A system for providing performance measurements of a packet-switched communication network, said system comprising:

a user communication device configured to run a performance measurement application, the performance measurement application being configured to monitor a performance of user packets which a user application, run by said user communication device and configured to provide the user communication device with a communication service offered by a service provider, exchanges with said packet-switched communication network, the user application supporting provision of the communication service by exchanging the user packets with the said packet-switched communication network and said monitoring comprising providing values of at least one performance parameter relating to the user packets which the user application, run by said user communication device, exchanges with said packet-switched communication network, the at least one performance parameter monitored by the performance measurement application being a round-trip packet loss value between the user communication device and a network node that terminates the path of the user packets, wherein based on said values of said at least one performance parameter provided by said performance measurement application, the user communication device detects a failure condition affecting said user packets which the user application, run by said user communication device, exchanges with said packet-switched communication network and informs a measurement management server cooperating with said performance measurement application run by said user communication device of said failure condition; and the measurement management server that is configured to, in response to the detection of the failure condition, activate a further monitoring of a performance of said user packets which the user application, run by said user communication device, exchanges with said packet-switched communication network by at least one measurement point cooperating with said measurement management server and located within said packet-switched communication network on a path of said user packets which the user application, run by said user communication device, exchanges with said packet-switched communication network, said further monitoring comprising providing values of at least one further performance parameter relating to said user packets which the user application, run by said user communication device, exchanges with said packet-switched communication network, wherein the performance measurement application is further configured to, activate a marking functionality on said user packets, the user packets comprising downstream user packets and upstream user packets, said marking functionality comprising:

marking the upstream user packets, and inducing a network node of said packet-switched communication network originating the downstream user packets to mark said downstream user packets;

detect said marked upstream user packets as transmitted by said user communication device and/or said marked downstream user packets as received by said user communication device; and provide said values of said at least one performance parameter based on said detecting.

12. The method according to claim 1, wherein the user communication device is at least one of a smartphone, a personal computer, a tablet, or an Internet of Things (IoT) device.

* * * * *